(12) United States Patent
Navé

(10) Patent No.: US 9,778,434 B2
(45) Date of Patent: *Oct. 3, 2017

(54) BUFFERED FIBERS WITH ACCESS FEATURES

(71) Applicant: Corning Optical Communications LLC, Hickory, NC (US)

(72) Inventor: Samuel Don Navé, Newton, NC (US)

(73) Assignee: Corning Optical Communications LLC, Hickory, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 14/926,154

(22) Filed: Oct. 29, 2015

(65) Prior Publication Data

US 2016/0048000 A1 Feb. 18, 2016

Related U.S. Application Data

(63) Continuation of application No. 13/658,431, filed on Oct. 23, 2012, now Pat. No. 9,176,293.

(60) Provisional application No. 61/552,769, filed on Oct. 28, 2011.

(51) Int. Cl.
*G02B 6/00* (2006.01)
*G02B 6/44* (2006.01)
*B05D 1/26* (2006.01)

(52) U.S. Cl.
CPC .......... *G02B 6/4495* (2013.01); *B05D 1/265* (2013.01); *G02B 6/4432* (2013.01); *G02B 6/4433* (2013.01); *G02B 6/4486* (2013.01)

(58) Field of Classification Search
None
See application file for complete search history.

(56) References Cited

U.S. PATENT DOCUMENTS

| | | |
|---|---|---|
| 3,076,235 A | 2/1963 | Rollins et al. |
| 3,991,014 A | 11/1976 | Kleinschuster |
| 4,067,852 A | 1/1978 | Calundann |
| 4,083,829 A | 4/1978 | Calundann et al. |
| 4,130,545 A | 12/1978 | Calundann |
| 4,237,337 A | 12/1980 | Serrander |
| 4,248,824 A | 2/1981 | Hattop |
| 4,318,842 A | 3/1982 | East et al. |
| 4,456,331 A | 6/1984 | Whitehead et al. |

(Continued)

FOREIGN PATENT DOCUMENTS

| | | |
|---|---|---|
| DE | 3821123 A1 | 12/1989 |
| DE | 3840353 A1 | 6/1990 |

(Continued)

OTHER PUBLICATIONS

U.S. Appl. No. 13/445,517, filed Apr. 12, 2012, Eric R. Logan, 29 pages.

(Continued)

*Primary Examiner* — Sung Pak
(74) *Attorney, Agent, or Firm* — William D. Doyle

(57) ABSTRACT

Buffered optical fibers are formed by extruding discontinuities in the buffer layer. The discontinuities allow the buffer layer to be torn to provide access to the buffered optical fiber. The discontinuities can be longitudinally extending strips of material in the buffer layer, and can be introduced into the extrudate material flow used to form the first section of the buffer layer in the extrusion head.

19 Claims, 6 Drawing Sheets

(56) References Cited

U.S. PATENT DOCUMENTS

| | | |
|---|---|---|
| 4,468,364 A | 8/1984 | Ide |
| 4,707,074 A | 11/1987 | Heywood |
| 4,729,628 A | 3/1988 | Kraft et al. |
| 4,848,868 A | 7/1989 | Rohner |
| 5,218,659 A | 6/1993 | Schneider |
| 5,360,497 A | 11/1994 | Schneider et al. |
| 5,442,722 A | 8/1995 | DeCarlo |
| 5,636,308 A | 6/1997 | Personne et al. |
| 5,651,081 A | 7/1997 | Blew et al. |
| 5,717,805 A | 2/1998 | Stulpin |
| 5,737,470 A | 4/1998 | Nagano et al. |
| 5,970,196 A * | 10/1999 | Greveling ............ G02B 6/4404 385/100 |
| 5,987,204 A | 11/1999 | Lee et al. |
| 6,041,153 A | 3/2000 | Yang |
| 6,088,499 A | 7/2000 | Newton et al. |
| 6,137,936 A | 10/2000 | Fitz et al. |
| 6,167,180 A | 12/2000 | Keller |
| 6,222,969 B1 | 4/2001 | Botelho et al. |
| 6,311,000 B1 | 10/2001 | Schneider |
| 6,351,589 B1 | 2/2002 | Leggett |
| 6,404,962 B1 | 6/2002 | Hardwick, III et al. |
| 6,519,396 B2 | 2/2003 | Schneider et al. |
| 6,542,674 B1 | 4/2003 | Gimblet |
| 6,545,222 B2 | 4/2003 | Yokokawa et al. |
| 6,546,176 B2 | 4/2003 | Anderson et al. |
| 6,563,991 B1 | 5/2003 | Witt et al. |
| 6,603,908 B2 | 8/2003 | Dallas et al. |
| 6,661,956 B2 | 12/2003 | Yamasaki et al. |
| 6,704,481 B2 | 3/2004 | Gaillard et al. |
| 6,728,455 B2 | 4/2004 | Kusakari et al. |
| 6,760,522 B2 | 7/2004 | Okada et al. |
| 6,766,091 B2 | 7/2004 | Beuth et al. |
| 6,813,421 B2 | 11/2004 | Lail et al. |
| 6,876,798 B2 | 4/2005 | Triplett et al. |
| 6,957,000 B2 | 10/2005 | McAlpine et al. |
| 7,029,137 B2 | 4/2006 | Lionetti et al. |
| 7,050,685 B2 | 5/2006 | Plemmons et al. |
| 7,085,459 B2 | 8/2006 | Conrad et al. |
| 7,116,872 B2 | 10/2006 | Okuno et al. |
| 7,123,801 B2 | 10/2006 | Fitz |
| 7,136,556 B2 | 11/2006 | Brown et al. |
| 7,187,830 B2 | 3/2007 | Blazer |
| 7,197,215 B2 | 3/2007 | Baird et al. |
| 7,218,821 B2 | 5/2007 | Bocanegra et al. |
| 7,225,534 B2 | 6/2007 | Kachmar |
| 7,251,411 B1 | 7/2007 | Lu et al. |
| 7,346,244 B2 | 3/2008 | Gowan et al. |
| 7,379,642 B2 | 5/2008 | Kachmar |
| 7,391,943 B2 | 6/2008 | Blazer et al. |
| 7,400,810 B2 | 7/2008 | Tanaka et al. |
| 7,403,685 B2 | 7/2008 | Wells |
| 7,415,181 B2 | 8/2008 | Greenwood et al. |
| 7,424,189 B2 | 9/2008 | Lu et al. |
| 7,471,862 B2 | 12/2008 | Bringuier et al. |
| 7,480,436 B2 | 1/2009 | Wells et al. |
| 7,489,843 B2 | 2/2009 | Carlson et al. |
| 7,532,796 B2 | 5/2009 | Chiasson |
| 7,539,380 B1 | 5/2009 | Abernathy et al. |
| 7,567,741 B2 | 7/2009 | Abernathy et al. |
| 7,587,111 B2 | 9/2009 | de Montmorillon et al. |
| 7,590,321 B2 | 9/2009 | Lu et al. |
| 7,603,012 B1 | 10/2009 | Ice |
| 7,623,747 B2 | 11/2009 | De Montmorillon et al. |
| 7,693,375 B2 | 4/2010 | Freeland et al. |
| 7,787,727 B2 | 8/2010 | Bringuier et al. |
| 7,796,853 B2 | 9/2010 | Abernathy et al. |
| 7,817,891 B2 | 10/2010 | Lavenne et al. |
| 8,582,939 B2 | 11/2013 | Gimblet et al. |
| 8,649,644 B2 | 2/2014 | Greenwood, III et al. |
| 8,737,787 B2 | 5/2014 | Gimblet et al. |
| 9,176,293 B2 * | 11/2015 | Nave ............ G02B 6/4432 |
| 2003/0118295 A1 | 6/2003 | Lail et al. |
| 2006/0045443 A1 | 3/2006 | Blazer |
| 2006/0127016 A1 | 6/2006 | Baird et al. |
| 2006/0210750 A1 | 9/2006 | Morrow et al. |
| 2006/0291787 A1 | 12/2006 | Seddon |
| 2008/0013899 A1 | 1/2008 | Gowan et al. |
| 2008/0193092 A1 | 8/2008 | Greenwood et al. |
| 2009/0087148 A1 | 4/2009 | Bradley et al. |
| 2009/0274425 A1 | 11/2009 | Caldwell et al. |
| 2009/0274426 A1 | 11/2009 | Lail |
| 2009/0317039 A1 | 12/2009 | Blazer et al. |
| 2009/0324182 A1 | 12/2009 | Kachmar et al. |
| 2010/0132973 A1 | 6/2010 | Fitz et al. |
| 2011/0217010 A1 | 9/2011 | Kachmar |
| 2011/0229098 A1 | 9/2011 | Abernathy et al. |
| 2013/0216192 A1 | 8/2013 | Gimblet et al. |

FOREIGN PATENT DOCUMENTS

| | | |
|---|---|---|
| DE | 4421456 A1 | 12/1995 |
| EP | 647866 A1 | 4/1995 |
| EP | 749129 A1 | 12/1996 |
| EP | 1168024 B1 | 6/2006 |
| EP | 1376156 B1 | 7/2006 |
| FR | 2793565 A1 | 11/2000 |
| GB | 2206976 A | 1/1989 |
| JP | 60-91306 A | 5/1985 |
| JP | 63-120206 U | 8/1988 |
| JP | 9-230184 A | 9/1997 |
| JP | 2005-148373 A | 6/2005 |
| JP | 2005-345622 A | 12/2005 |
| JP | 2006-162703 A | 6/2006 |
| JP | 2006-171570 A | 6/2006 |
| JP | 2006-251769 A | 9/2006 |
| JP | 2006-251770 A | 9/2006 |
| JP | 2006-267600 A | 10/2006 |
| JP | 2007-272006 A | 10/2007 |
| JP | 2009-37150 A | 2/2009 |
| JP | 2009-258153 A | 11/2009 |
| KR | 2006-0081266 | 7/2006 |
| KR | 2006-0107414 | 10/2006 |
| WO | 03/046074 A1 | 6/2003 |
| WO | 2004/021367 A2 | 3/2004 |
| WO | 2005/096053 A1 | 10/2005 |
| WO | 2006/097540 A1 | 9/2006 |
| WO | 2010/068857 A2 | 6/2010 |
| WO | 2010/105657 A1 | 9/2010 |
| WO | 2011/109498 A2 | 9/2011 |
| WO | 2011/137236 A1 | 11/2011 |
| WO | 2012/058181 A1 | 5/2012 |
| WO | 2012/071490 A2 | 5/2012 |
| WO | 2013063041 | 5/2013 |

OTHER PUBLICATIONS

U.S. Appl. No. 13/489,901, filed Jun. 6, 2012, Michael J. Gimblet, 23 pages.
U.S. Appl. No. 13/560,374, filed Jul. 27, 2012, Michael John Gimblet, 24 pages.
U.S. Appl. No. 13/646,962, filed Oct. 8, 2012, Anne Germaine Bringuier, 26 pages.
U.S. Appl. No. 13/658,404, filed Oct. 23, 2012, Michael John Gimblet, 21 pages.
U.S. Appl. No. 13/658,431, filed Oct. 23, 2012, Samuel Don Nave, 19 pages.
Nippon Telegraph and Telephone Corporation, Specification for Aerial SM Optical Fiber Cable, Spec. No. 520292, $4^{th}$ Version, Jul. 29, 2002, 56 pages.
Renka Corporation, Single Mode Optical Fiber Cable, Specification No. RENKA/OFC/SM-DI/AR, Dec. 2000, 13 pages.
PCT IPRP for Publication WO2011137236, Nov. 6, 2011, 10 pages.
PCT ISR for Publication WO2011137236, Aug. 9, 2011, 6 pages.
PCT ISR for Publication WO2012058181, Feb. 23, 2012, 4 pages.
PCT ISR for Publication WO2012071490, Sep. 12, 2012, 7 pages.
European Patent Office, European Search Report, Application No. EP 12190014.6, mail date Feb. 11, 2013, 10 pages.
Patent Cooperation Treaty International Search Report and Written Opinion for International Application No. PCT/US2012/061584; mailing date Feb. 18, 2013, 11 pages.

(56) References Cited

OTHER PUBLICATIONS

European Patent Application No. 12190014.6 Office Action Dated Oct. 16, 2015; European Patent Office; 8 Pages.

* cited by examiner

BUFFERED FIBERS WITH ACCESS FEATURES

RELATED APPLICATIONS

This application is a continuation of U.S. application Ser. No. 13/658,431, filed Oct. 23, 2012, which claims the benefit of priority under 35 U.S.C. §119 of U.S. Provisional Application No. 61/552,769, filed on Oct. 28, 2011, the content of which is relied upon and incorporated herein by reference in its entirety.

BACKGROUND

FIG. 1 depicts a conventional buffered optical waveguide 7. Conventional buffered optical waveguide 7 includes an optical fiber 1 and a buffer layer 5. Optical fiber 1 generally includes a core 1a, a cladding 1b, and a coating 1c. Core 1a has an index of refraction that is greater than that of cladding 1b, thereby promoting internal reflection for transmitting optical signals. At the time of manufacture, cladding 1b is typically coated with one or more layers of coating 1c such as a UV-curable acrylate polymer. Typical outer diameters for these components are about 10 microns for a single mode core (or 50-62.5 microns for a multimode core), 125 microns for the cladding, and 250 microns for the coating. A buffer layer 5 is extruded over the coating 1c to protect the optical fiber from stresses and/or strains. One common buffer layer 5 typically has an outer diameter of about 900 microns to protect the optical fiber. Buffer layer 5 is extruded over optical fiber 1 in a relatively hot liquid form and quenched in a water trough. The buffer layer 5 can be either tight or loose, depending on the degree of coupling between optical fiber 1 and buffer layer 5. In both cases the layer 5 must be stripped from the optical fiber before an optical connection to the optical fiber can be made.

End users have generic requirements for the stripability of buffer layer 5 from optical fiber 1 so that optical connections can easily be performed. For example, in certain connectorized assemblies there is a need to strip tight buffered fiber up to 30" or more to the 250 um coating for furcation purposes. This is currently very difficult to do and requires multiple passes with stripping tool such as a Miller tool. The multiple passes often results in damage to the fiber or breaking the fiber before the desired length of buffer has been removed.

U.S. Pat. No. 6,597,000 proposes an alternative buffer tube access feature, in which preferential tear lines, such as longitudinally-extending slits, are formed on the buffer tube exterior. The slits allow the buffer tube to be separated into halves to provide access to the optical fiber. Non-round buffer tubes, however, may meet with resistance from certain customers.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the invention.

DETAILED DESCRIPTION

Figure 2:
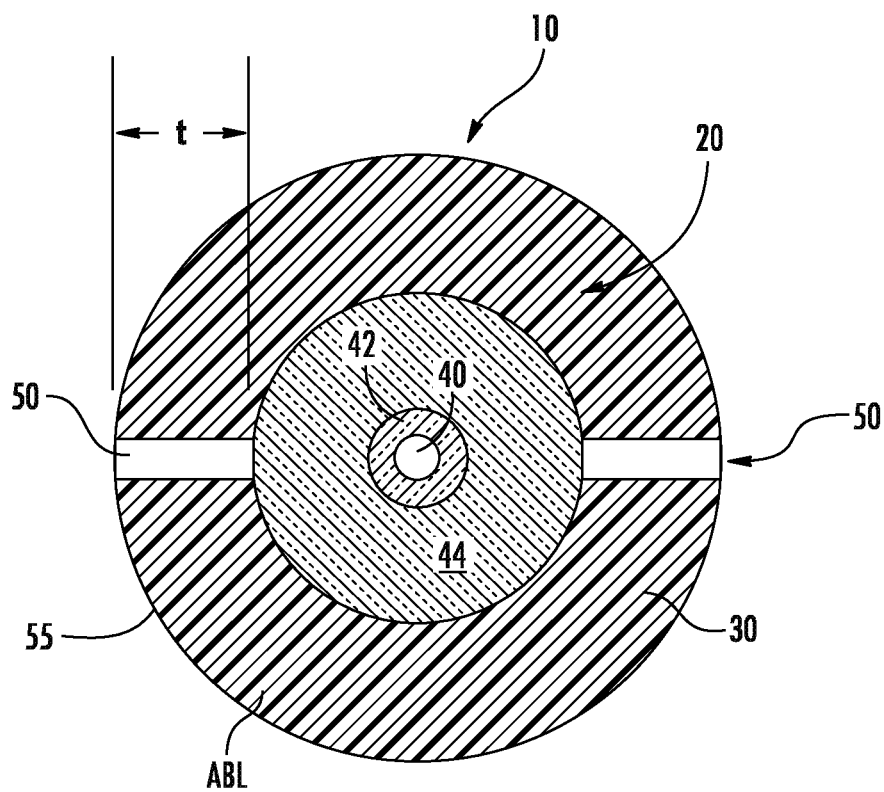
FIG. 2 is a cross-sectional view of a buffered optical fiber according to a present embodiment.

FIG. 2 is a cross-sectional view of a buffered optical fiber 10 according to a present embodiment. The buffered optical fiber 10 comprises an optical fiber 20 surrounded by a buffer layer 30. The optical fiber 10 is illustrated as a tight buffered optical fiber, although the present embodiments can be addressed to loose buffered optical fibers. The exemplary optical fiber 10 is a single mode optical fiber having a silica-based core 40 that is operative to transmit light and is surrounded by a silica-based cladding 42 having a lower index of refraction than the core. Additionally, a single or multilayer coating layer 44 can be applied over the cladding 42. For example, the coating 44 can include a soft primary coating surrounding the cladding, and a relatively rigid secondary coating surrounding the primary coating. The coating 44 can also include an identifying means such as ink or other suitable indicia for identification of the optical fiber. However, the coating 44 may exclude lubricants applied after the manufacture of the optical fiber that are intended to improve the stripability of the tight buffer layer from the optical fiber by conventional stripping methods. In this embodiment, buffer layer 30 surrounds, and at least partially contacts, at least one coating 44 of optical fiber 10.

A "tight buffer layer" or "buffer layer" according to the present embodiments should not be confused with a buffer tube or a cable jacket. Buffer tubes typically include one or more optical fibers disposed within the buffer tube that float in a water-blocking grease, such as a thixotropic gel. Moreover, buffer tubes generally have a relatively large inner diameter when compared to the outer diameter of the optical fibers therein. Furthermore, water-blocking grease should not be confused with an interfacial release layer. Water-blocking grease is used to inhibit the migration of water within the buffer tube and provide coupling, whereas an interfacial release layer is used for improving stripability of the buffer layer from the optical fiber. Moreover, buffer layers are generally coupled to the optical fiber. In general, buffered fibers have an outside diameter of less than or equal to 1100 microns. More commonly, tight buffered fibers have outside diameters of less than or equal to 1000 microns.

The buffer layer 30 has a predetermined wall thickness t and generally surrounds optical fiber 10. The thickness t of the buffer layer 30 will generally fall in the range of 125-425 microns. According to one embodiment of the present invention, the tight buffer layer 30 includes one or more discontinuities 50 that extend along the length of the buffered optical fiber 10. In this specification, the term "discontinuity" indicates a portion of the buffer layer 30 of different material composition than a main portion of the buffer layer 30, the main portion being indicated by reference number 55. The main portion 55 can essentially be an annular hoop surrounding the optical fiber 20, with the discontinuities 50 extending longitudinally through the main portion 55 along a selected length of the buffered optical fiber 10. According to one aspect, the discontinuities 50 provide lines of weakness that allow the buffer layer 30 to be separated to provide easy access to the optical fiber 40, so that the use of sharp access tools can be avoided, to speed access, and other advantages. The illustrated discontinuities 50 extend along the entire buffered optical fiber length, although shorter lengths may be used to provide access to the optical fiber 20.

Figure 1:
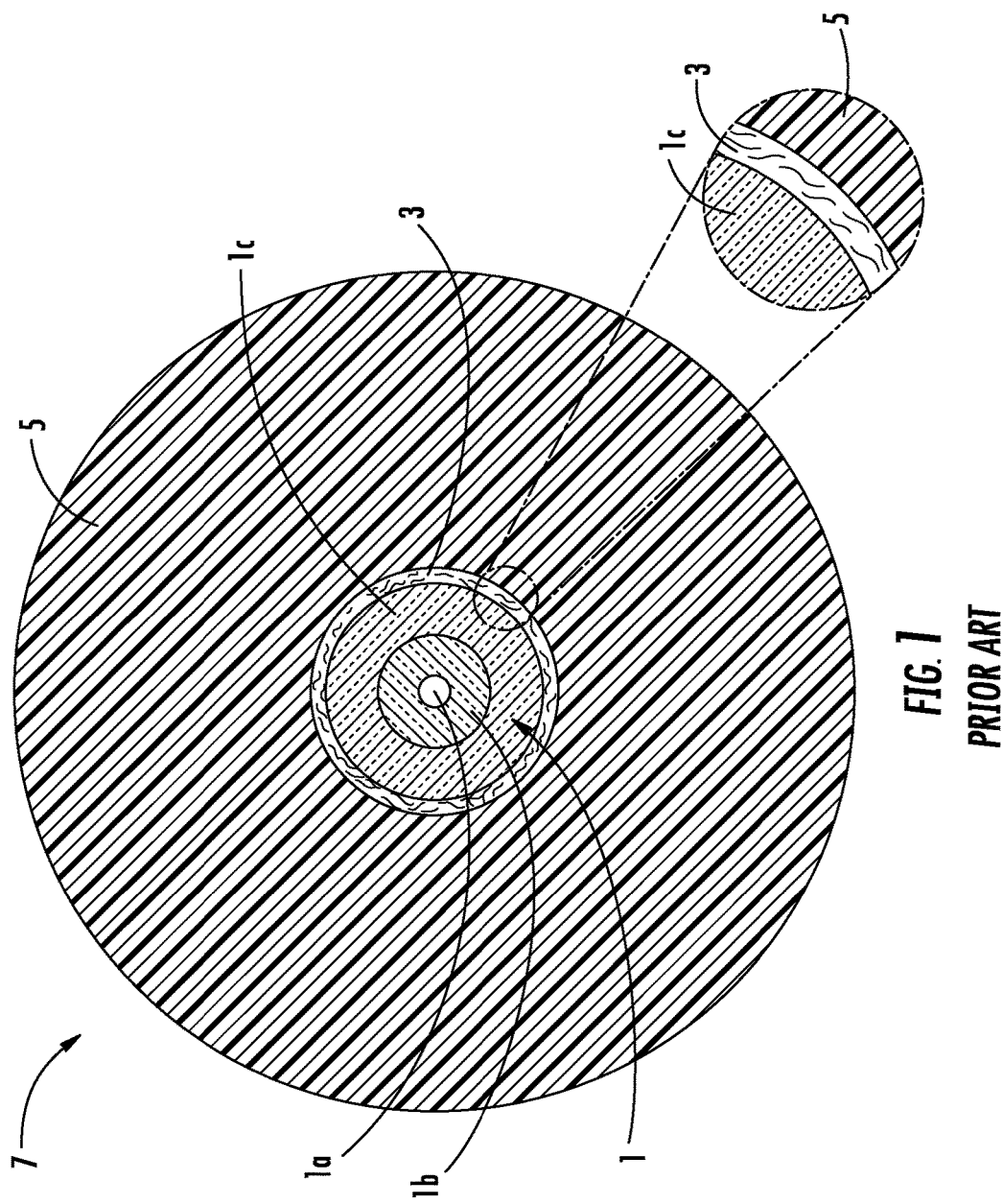
FIG. 1 is a cross-sectional view of a prior art buffered optical fiber.

In exemplary embodiments, discontinuities 50 can be relatively narrow strips in the buffer layer 30, and may occupy relatively small portions of the buffer layer cross-sectional area ABL. For example, the discontinuities 50 can have cross-sectional areas AD that are less than 8% of ABL. In the illustrated embodiment, the discontinuities 50 each have cross-sectional areas AD that are less than 6% of ABL. In FIG. 1, two discontinuities 50 are formed in the buffer layer 30 for removal of one half of the buffer layer from the opposite half. Depending on the form that the optical fiber 20 takes, the number, spacing, shape, composition and other aspects of the discontinuities 50 can be varied. For example, a single discontinuity in the buffer layer 30 may be sufficient to allow the buffered optical fiber buffer layer 30 to be peeled away from the coating 44.

These discontinuities allow the craftsman to initiate a separation at the discontinuities and then to easily grasp the separated portions of tight buffer layer 30 and propagate the separation of the opposed sections by applying a predetermined tearing force. Thus, the craftsman can access optical fiber 10 quickly and easily without damaging the optical fiber or the coating 44. Moreover, tight buffered optical fiber 10 does not require a lubricant as an interfacial release layer in order to remove tight buffer layer 30 in relatively long lengths such as one meter. However, embodiments of the present invention may include a lubricant as an interfacial release layer that acts as a slip layer between buffer layer 30 and optical fiber 40.

In the exemplary embodiment, the discontinuities 50 are bonded to the main portion 55 of the buffer layer when the buffer layer 30 is extruded. The illustrated discontinuities 50 are partially embedded in the main portion 55, with each end of the discontinuities extending to an inner and an outer edge of the buffer layer 30. One of both ends of the discontinuities 50 may be, however, wholly embedded in the main portion 55.

The main portion 55 and the discontinuities 50 can be formed from extrudable polymers, so that as the extrudates used to form the main portion 55 and the discontinuities 50 cool and solidify, the extrudates become bonded to a desired degree at an interface on each side of a discontinuity 50. When the discontinuities 50 are formed while extruding the main portion 55 of the buffer layer, the bond between discontinuity 50 and the remainder of the buffer layer 30 can be generally described as enabled by polymer chain entanglement as the buffer layer 30 solidifies. The buffer layer 30 accordingly comprises a cohesive composite polymer structure. The buffered optical fiber buffer layer 30 can also include tactile locator features (not shown), such as raised surfaces, or 'bumps', or depressed surfaces such as 'divots' or channels, that provide a tactile indication of the location of the discontinuities. A visual indication such as a stripe could also be extruded over the location of the discontinuities so that their locations are apparent from the buffered optical fiber exterior. Tactile or visual indicators can extend along the entire length of the buffered optical fiber, or along selected lengths.

Figure 3:
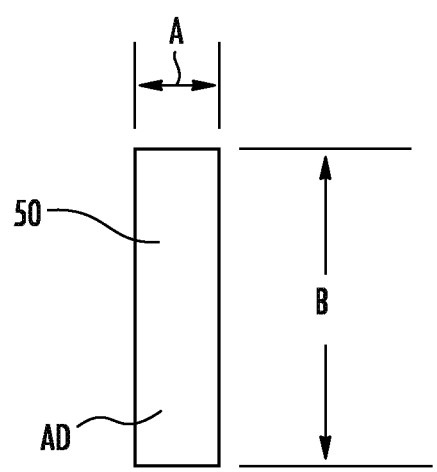
FIG. 3 is an isolated cross-sectional view of one of the discontinuities in the buffer layer of FIG. 2.

FIG. 3 is an isolated view of one of the discontinuities 50 in the buffer layer 140. A discontinuity 50 can have a maximum width A and a height B. The buffer layer thickness is t. According to one aspect, the aspect ratio A:B is in the range of 1:2 to 1:100. In general, lower aspect ratios A:B, which indicates narrower discontinuities, are favorable in buffered optical fiber cross-sections as shown in FIG. 1. The illustrated ratio B:t is 1:1, which indicates that the height of a discontinuity is the same as the buffer layer thickness t. The ratio B:t is selected to provide ease of access to the optical fiber and to maintain sufficient robustness of the buffered optical fiber 10, and will vary with factors such as the fracture toughness of the material of the primary portion 55, the bond between the discontinuities 50 and the primary portion 55, and other factors. According to one embodiment, the ratio B:t is at least 1:4, or, stated alternatively, B is at least ¼ of the buffer layer thickness t at the centerline of the buffered optical fiber. If an extremely thin, "film" type embodiment of discontinuity 50 is included, the maximum width A of a discontinuity can be in the range of 0.1 mm or less, and may be about 0.05 mm The buffer layer main portions 55 and the discontinuities 50 described in this specification may be made from various polymer materials. In the exemplary embodiments, the main portion 55 can be extruded from a first extrudable polymeric material, e.g. PVC, and the discontinuities can be extruded from a second extrudable polymeric material, e.g., a modified PVC. One modified PVC is a PVC that has been modified by adding silicone-based release agents into the formulation. The FR polyolefin Megolon 8037DD available from AlphaGary Corporation of Leominster, Mass. is another possibility for the second polymer. This compound incorporates acrylate functional groups into the polymer chain. The acrylate functional groups will form a bond with the PVC of the main portion 55 when coextruded and allow the jacket to withstand mechanical testing and handling yet still peel apart. The existence of the acrylate functional groups allows the discontinuities 50 to form a desired bond with the main portion 55. FR polyolefins without acrylate functional groups (e.g., Megolon 8142 and Megolon 8553—AlphaGary Corporation) may be used for minimal bonding at the main portion/discontinuity interface.

Figure 4:
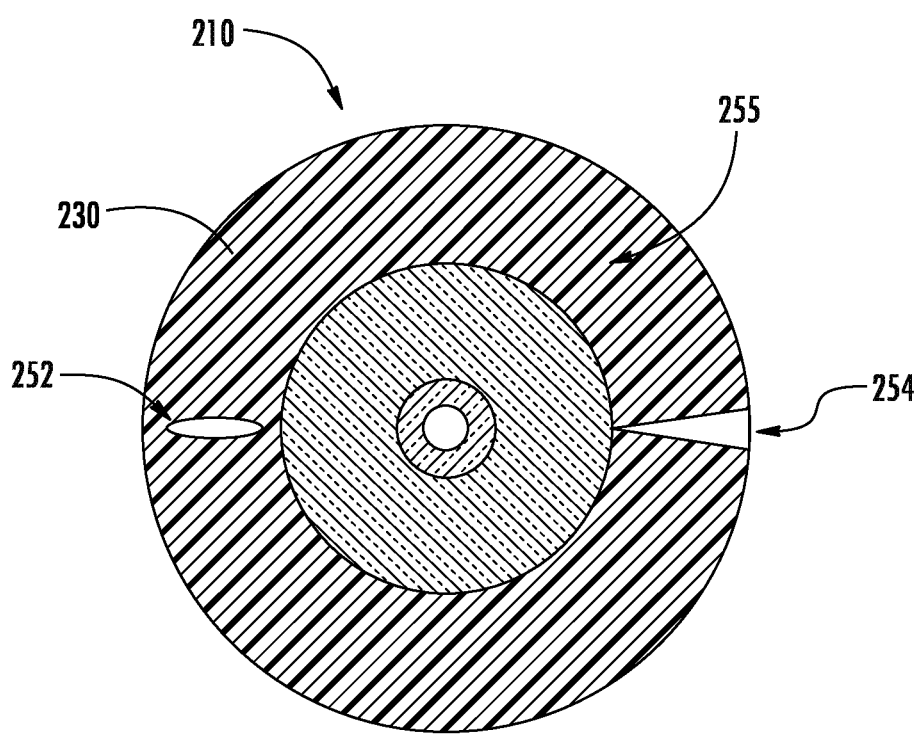
FIG. 4 is a cross-sectional view of a buffered optical fiber according to a second embodiment.

FIG. 4 is a cross-sectional view of a buffered optical fiber 210 according to a second embodiment. The buffered optical fiber 210 has a buffer layer 230 with a main portion 255, and can be generally identical in structure and composition to the buffered optical fiber 10. In the buffer layer 230, however, one discontinuity 252 is shown as wholly embedded in the main portion 255. A second discontinuity has a triangle shape that begins with a wide surface area at the exterior surface of the buffer layer 230, and closes to a point towards the inner surface of the buffer layer. Various combinations of wholly and partially embedded discontinuities can be provided in the buffer layers in this specification to provide differing access characteristics.

In the illustrated buffered optical fibers, the discontinuities are spaced at approximately 180 degrees. Other arc spacings of the discontinuity pairs could also be used. For example, arc spacings of between 30 and 180 degrees.

Figure 5:
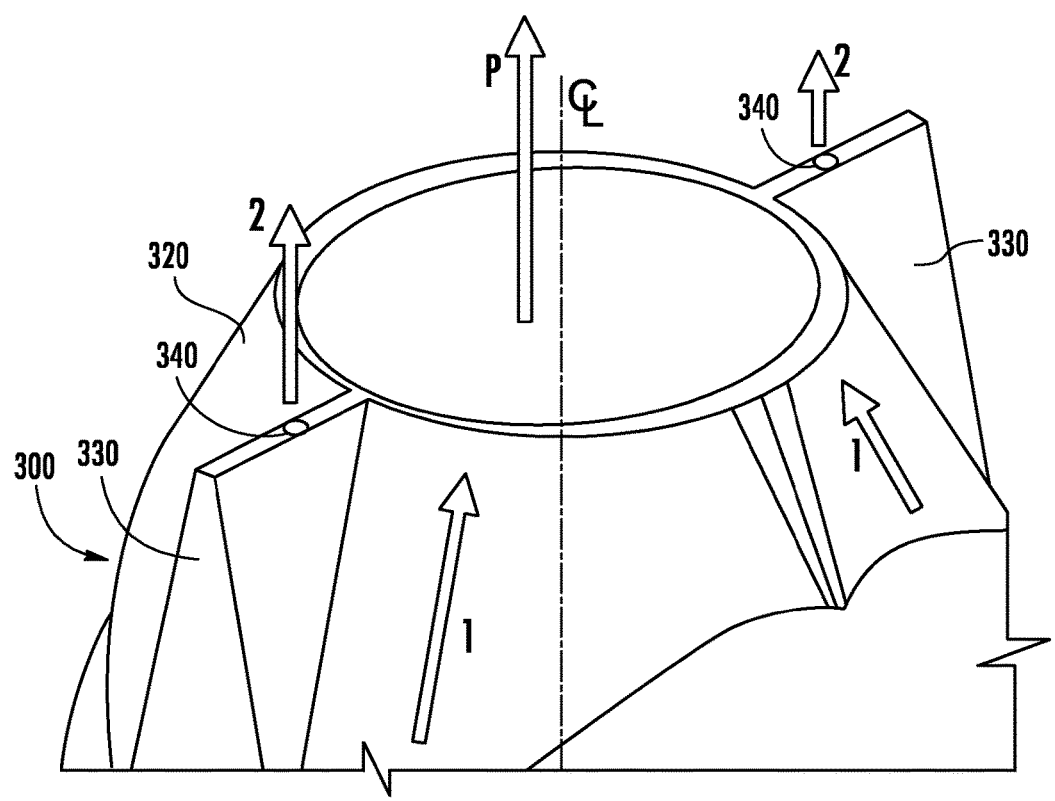
FIG. 5 is a cutaway view of a portion of a coextrusion apparatus used to manufacture buffered optical fibers with discontinuities.

FIG. 5 is a cutaway section view of a coextrusion flow diverter 300 that can be used in conjunction with an extrusion crosshead used to form a buffer layer with embedded discontinuities, such as the discontinuity 252 shown in FIG. 4. In such an extrusion apparatus, the extrusion tip and die are directly downstream of flow diverter 300. The arrows 1 in FIG. 5 illustrate the flow direction of a first molten extrudate, and the arrows 2 indicate the flow direction of a second molten extrudate. The flow diverter 300 has an exterior surface 320 over which flows the first molten extrudate material that is used to form the main portion of the buffer layer. The diverter 300 includes a pair of struts or fins 330, each having a port 340 that allows introduction of the second molten extrudate material used to form the discontinuities into the flow of the first molten extrudate. The flow diverter 300 acts to divide the first material around the ports 340 supplying the second material. The first and second extrudate materials join downstream of the flow diverter 300. As the first and second materials are extruded, a coated optical fiber advances along the center line CL in the process direction P. The first and second extrudate materials draw down, cool, and solidify around the coated optical fiber advancing through the crosshead to form the buffer layer.

Figure 7:
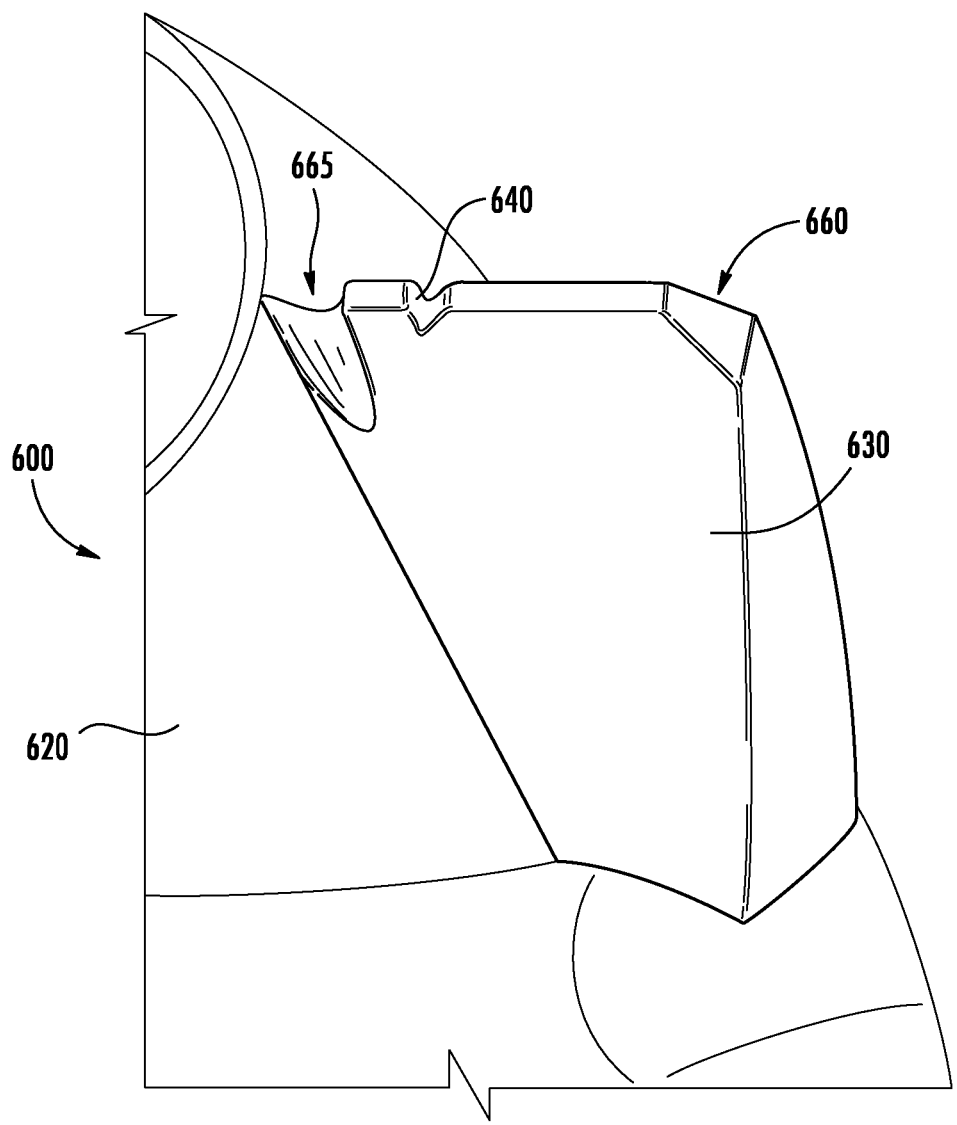
FIG. 7 is a cutaway view of a portion of a coextrusion apparatus used to manufacture buffered optical fibers with discontinuities according to a second embodiment.

FIG. 7 shows another such diverter 600 with an exterior surface 620 having ports 640 for the second molten material and features, such as beveled outer edges 660, inside edge slots 665 of fins 630, to control shape of the combined structure by compensating for the change in net extrudate flow volume associated with the second molten extrudate. Further, the ports 640 are located in such a feature, shown as a groove.

Figure 6:
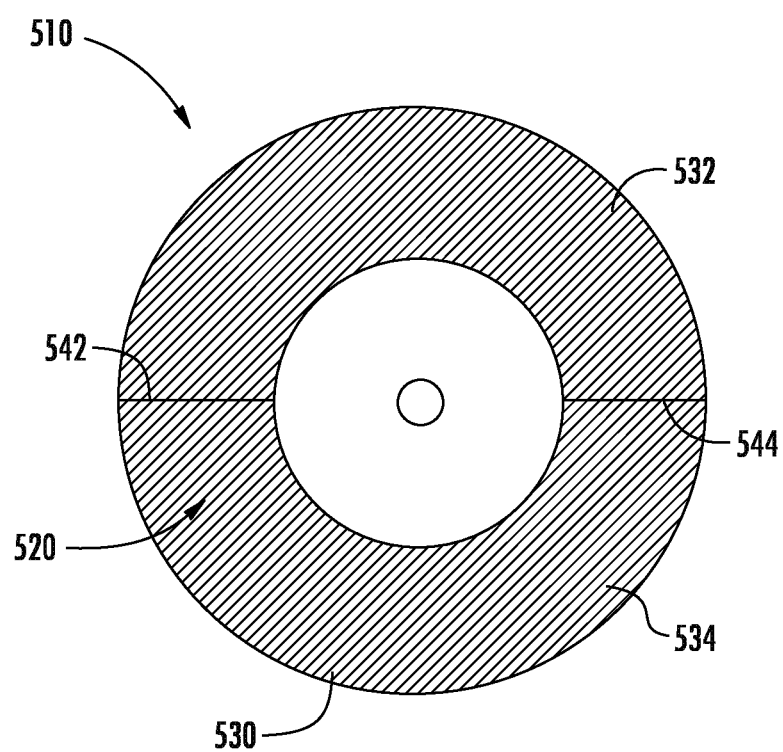
FIG. 6 is a cross-sectional view of a buffered optical fiber according to a third embodiment.

FIG. 6 is a cross-sectional view of a buffered optical fiber 510 according to a second embodiment. The buffered optical fiber 510 has an optical fiber 520 and a buffer layer 530 surrounding the optical fiber 520. Rather than having a partially or wholly embedded discontinuity to provide access, the buffered optical fiber 510 has a buffer layer 530 formed from a first extruded section 532 bonded to a second extruded section 534. The first and second sections can be formed in a single extrusion head and bonded during that process.

In FIG. 6, each section comprises half, or 50%, of the total area of the buffer layer 530. One section could occupy less of the total area. Each section 532, 534 can occupy, for example, between 80-280 degrees of arc, or between 20-80% of the total area, of the annular buffer layer 530.

The first section 532 is comprised of a first polymeric material and the second section 534 is formed from a second polymeric material that is different form the first material. The bond between the first and second polymeric materials is selected to provide lines of weakness that allow the buffer layer to be pulled apart at the interfaces 542, 544. The buffer layer 530 can be formed by extruding a first stream of the first polymeric material extrudate and having it join to a second stream of the second polymeric material extrudate so that the two streams bond during the extrusion process. The first and second polymeric materials can be formed from, for example, PVC with differing fill materials. The first and second polymers should be selected to have similar temperature variation properties so that excessive stresses are not created between the two sections during temperature changes.

Another mechanism to achieve a discontinuity would be to extrude the second molten material flow at a temperature below its recommended melt temperature. In this case, the first and second material flows could be of the same extrudate material, but the second material flows would be at a lower temperature. This would cause a weakened bond at the interface of the discontinuities and the main portion—effectively forming a weak weld line at the interfaces of the discontinuities with the main portion.

In this specification, the terms "polymer" and "polymeric" indicate materials comprised primarily of extrudable polymer materials such as, for example, copolymers, but allows for the presence of non-polymer materials such as additives and fillers.

In the present embodiments, any suitable optical waveguide can be used, such as multi-mode, single-mode, plastic optical fibers, erbium doped, polarization-maintaining, photonic, specialty, or any other suitable optical waveguide.

In general, the separation properties disclosed in this specification may be obtained by coextruding the discontinuities from a different material than the material used to form the main portion of the buffer layer. As an alternative method, the discontinuities may be made from the same material as the remainder of the buffer layer, but subjected to different curing conditions, for example.

What is claimed is:

1. A buffered optical fiber, comprising:
a single optical fiber having a longitudinal length; and
an extruded buffer layer surrounding and in contact with the single optical fiber along the longitudinal length, the buffer layer comprising:
a main portion of a first extruded polymeric material;
at least one discontinuity of a second polymeric material coextruded in the main portion, the discontinuity extending along the longitudinal length of the single optical fiber, and the first polymeric material being different from the second polymeric material; and
a bond formed during coextrusion between the discontinuity and the main portion such that the buffer layer comprises a cohesive composite polymer structure that is separable at the discontinuity to provide access to the single optical fiber,
wherein the bond is enhanced by incorporation of an acrylate functional group into a polymer chain of the second polymeric material,
wherein the main portion includes a PVC material, wherein the second polymeric material is a polyolefin material, and wherein the acrylate functional group is incorporated into a polyolefin polymer chain of the second polymeric material.

2. The buffered optical fiber of claim 1, wherein a cross-sectional area of the discontinuity is less than 8% of a cross-sectional area of the buffer layer.

3. The buffered optical fiber of claim 1, wherein the discontinuity extends along an entire length of the optical fiber.

4. The buffered optical fiber of claim 1, wherein the buffer layer has an interior surface that faces the optical fiber and an exterior surface, the discontinuity forming a portion of the exterior surface, wherein the discontinuity extends radially inward from the exterior surface a distance of at least fifty percent of a thickness of the buffer layer.

5. The buffered optical fiber of claim 1, wherein a cross-sectional area of the discontinuity is less than 6% of a cross-sectional area of the buffer layer.

6. The buffered optical fiber of claim 5, wherein the discontinuity is wholly embedded in the main portion.

7. The buffered optical fiber of claim 1, wherein the at least one discontinuity comprises a first discontinuity at least partially embedded in the main portion and a second discontinuity at least partially embedded in the main portion, the first discontinuity being spaced from the second discontinuity.

8. The buffered optical fiber of claim 7, wherein a cross-sectional area of each discontinuity is less than 8% of a cross-sectional area of the buffer layer.

9. The buffered optical fiber of claim 7, wherein a height of the first discontinuity is at least two times greater than a maximum width of the first discontinuity.

10. A method of manufacturing a buffer layer for an optical fiber, the method comprising:
extruding a main portion of a first polymeric material to be in contact with the optical fiber;

co-extruding at least one discontinuity of a second polymeric material in the main portion, the discontinuity extending along a longitudinal length of the main portion, and the first material being different from the second material;

forming a bond during coextrusion between the discontinuity and the main portion such that the buffer layer comprises a cohesive composite polymer structure that is separable at the discontinuity; and forming the buffer layer to have an outside diameter of less than 1100 microns.

11. The method of claim 10, further comprising enhancing the bond by incorporating an acrylate functional group into a polymer chain of the second polymeric material.

12. The method of claim 10, further comprising forming the buffer layer to have a thickness in the range of 125-425 microns.

13. The method of claim 10, wherein the optical fiber includes a silica-based core, a silica-based cladding surrounding the core, and at least one coating surrounding the cladding.

14. The method of claim 13, further comprising extruding the buffer layer directly over the at least one coating to abut the coating.

15. The method of claim 10, wherein a cross-sectional area of the discontinuity is less than 6% of a cross-sectional area of the buffer layer.

16. The method of claim 10, further comprising wholly embedding the discontinuity in the main portion.

17. The method of claim 10, wherein the main portion includes a PVC material.

18. The method of claim 10, wherein co-extruding the at least one discontinuity comprises co-extruding a first discontinuity at least partially embedded in the main portion and co-extruding a second discontinuity at least partially embedded in the main portion, the first discontinuity being spaced from the second discontinuity.

19. A buffered optical fiber, comprising:
an optical fiber having a longitudinal length; and
an extruded buffer layer surrounding and in contact with the optical fiber along the longitudinal length, the buffer layer comprising:
a main portion of a first extruded polymeric material;
at least one discontinuity of a second polymeric material coextruded in the main portion, the discontinuity extending along the longitudinal length of the optical fiber, and the first polymeric material being different from the second polymeric material; and
a bond formed during coextrusion between the discontinuity and the main portion such that the buffer layer comprises a cohesive composite polymer structure that is separable at the discontinuity to provide access to the optical fiber,
wherein the second polymeric material is a polyolefin material and includes an acrylate functional group incorporated into a polyolefin polymer chain of the second polymeric material.

* * * * *